United States Patent Office 3,527,866
Patented Sept. 8, 1970

3,527,866
17β-PHENOXYACETYLOXYESTR-4-EN-3-ONES
Takuichi Miki, Amagasaki, Kentaro Hiraga, Ikeda, Tsunehiko Asako, Suita, Toru Yui, Osaka-fu, and Michio Masuoka, Suita, Japan, assignors to Takeda Chemical Industries, Ltd., Osaka, Japan
No Drawing. Filed July 28, 1967, Ser. No. 656,659
Claims priority, application Japan, July 28, 1966, 41/49,808; June 6, 1967, 42/36,120
Int. Cl. C07c 169/08
U.S. Cl. 424—243    5 Claims

ABSTRACT OF THE DISCLOSURE

17β-phenoxy-acetyloxyestr-4-en-3-one and the corresponding 6-methyl and 6,6-dimethyl derivatives exhibit an unexpectedly high anabolic action and an improved anabolic/androgenic ratio vis-a-vis, e.g., 19-nortestosterone phenylpropionate and related known anabolic agents.

---

The present invention relates to novel and useful phenoxy-acetic acid esters of estrane derivatives, and more particularly to compounds of the formula

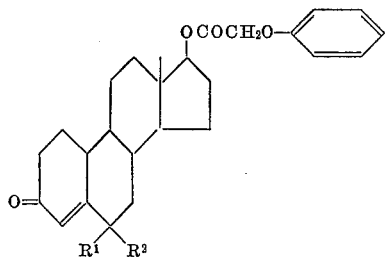

wherein each of $R^1$ and $R^2$ stands for H or methyl.

19-nortestosterone and its derivatives such as 17α-ethyl-19-nortestosterone, 19-norandrosterone, etc., are known as anabolic agents (or myotrophic agents) which promote protein anabolism and generally stimulate tissue growth, and therefore these compounds are useful in the treatment of those suffering from various metabolic disorders. It is also known that a prolonged effect is expected in those derivatives in which the hydrogen of the 17-OH group is replaced by acyl, such as acetyl, propionoyl, octanoyl, 3-cyclopentylpropionoyl, phenylacetyl or phenylpropionoyl. Above all, 19-nortestosterone phenyl propionate (17β-phenylpropionyloxyestr-4-en-3-one) is most widely used because of its favorable anabolic/androgenic ratio as well as its prolonged action.

It has now been discovered unexpectedly that the phenoxy-acetic acid esters (I) of estrane derivatives exhibit a two-fold or greater anabolic effect than that of 19-nor-testosterone phenylpropionate, while retaining moderately prolonged action. Furthermore, it has been found that the compounds (I) have far less harmful side effects in comparison with 19-nortestosterone phenylpropionate at their effective doses, and that compounds (I) represent a better anabolic/androgenic ratio.

It is the principal object of the present invention to provide the novel and useful compounds of Formula I.

A further object is to provide new pharmaceutical compositions containing a compound or compounds of (I).

Other objects of the present invention and advantageous features thereof will become apparent as the description proceeds.

The phenoxyacetates (I) are prepared by reacting a compound of the formula

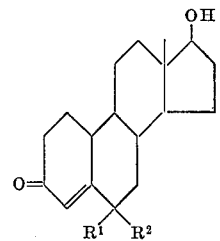

wherein each of $R^1$ and $R^2$ has the same meaning as above, its ketal-or enol-type derivative, with a phenoxyacetylating agent.

Starting compounds (II) include, for example, the following:

(1) 19-N-testosterone;
(2) 6-methyl-19-nor-testosterone;
(3) 6,6-dimethyl-19-nor-testosterone;
(4) 3-methoxyestra-2,5(10)-dien-17-ol;
(5) 3-ethoxyestra-3,5(6)-dien-17-ol;
(6) 3-propyloxyestra-3,5(6)-dien-17-ol;
(7) 3-phenoxyestra-3,5(6)-dien-17-ol;
(8) 3,3-dimethoxyestr-4 or 5(6)-en-17-ol;
(9) 3,3-diethoxyestr-4 or 5(6)-en-17-ol;
(10) 3,3-dipropoxyestr-4 or 5(6)-en-17-ol;
(11) 3,3-ethylenedioxyestr-4-en-17β-ol;
(12) 6-methyl-3-methoxyestra-3,5(6)-dien-17-ol;
(13) 6-methyl-3-ethoxyestra-3,5(6)-dien-17-ol;
(14) 6-methyl-3-propyloxyestra-3,5(6)-dien-17-ol;
(15) 6-methyl-3-phenoxyestra-3,5(6)-dien-17-ol;
(16) 6-methyl-3,3-dimethoxyestr-4 or 5(6)-en-17-ol;
(17) 6-methyl-3,3-diethoxyestr-4 or 5(6)-en-17-ol;
(18) 3,3-diethylenedioxy-6-methylestr-4-en-17β-ol;
(19) 6,6-dimethyl-3-methoxyestra-2,5(10)-dien-17-ol;
(20) 6,6-dimethyl-3-ethoxyestra-3,5(6)-dien-17-ol;
(21) 6,6-dimethyl-3-propoxyestra-3,5(6)-dien-17-ol;
(22) 6,6-dimethyl-3-phenoxyestra-3,5(6)-dien-17-ol;
(23) 6,6-dimethyl-3,3-dimethoxyestr-4 or 5(6)-en-17-ol;
(24) 6,6-dimethyl-3,3-diethoxyestr-4 or 5(6)-en-17-ol;
(25) 6,6-dimethyl-3,3-dipropoxyestr-4 or 5(6)-en-17-ol;
(26) 3,3-ethylenedioxy-6,6-dimethylestr-4-en-17β-ol.

Suitable as phenoxyacetylating agent are, for example, phenoxyacetic acid, phenoxyacetic acid anhydride, phenoxyacetyl halide (such as phenoxyacetyl chloride or phenoxyacetyl bromide), phenoxyacetylimidazolide, phenoxyacetylmethylimidazolide, etc.

The reaction is usually carried out in a suitable solvent, for the purpose of accelerating the reaction and of avoiding side-reactions. The solvent is exemplified by amine (e.g., pyridine, picoline, collidine, etc.), halogenated hydrocarbon (e.g., chloroform, methylene chloride, carbon tetrachloride, ethylene chloride, etc.), hydrocarbon (e.g., benzene, toluene, hexane, etc.), alcohol (e.g., methanol, ethanol isopropanol, etc.), ether (e.g., tetrahydrofuran, dioxane, etc.), ketone (e.g., acetone, methyl ethyl ketone, etc.) and mixtures thereof. The reaction is accelerated in the presence of a basic substance (e.g., sodium hydroxide, potassium hydroxide, etc.), when a phenoxyacetyl halide is employed as phenoxyacetylating agent. The reaction usually takes place at ambient temperature (20° C. to 30° C.) but, if desired, it can be carried out at an elevated or a relatively lower temperature.

Phenoxyacetyl derivatives obtained by employing the enol- or ketal derivatives as the starting compounds are further treated with inorganic acid (e.g., dilute hydrochloric acid, dilute sulfuric acid, phosphoric acid, etc.), organic acid (e.g., formic acid, acetic acid, oxalic acid, toluene sulfonic acid, etc.) or cation exchange resin, etc., to restore the oxo-radical positioned at 3, or treated with said inorganic or organic acid, cation exchange-resin or basic substance such as pyridine, Triton B, alkali metal hydroxide, alkali metal carbonate, alkali metal acylate, quaternary ammonium hydroxide, tertiary amine, etc., to shift the double bond to the 4-position.

The compounds (I) are useful as anabolic agents in situations where use has heretofore been made of, e.g., 19-nortestosterone phenylpropionate, and are generally administered in an injectable form. These injections are prepared, for example, by dissolving or suspending the compounds (I) in vegetable oil (e.g., sesame oil, cottonseed oil, castor oil, olive oil, corn oil, peanut oil, etc.) in combination, if desired, with antiseptic (e.g., benzyl alcohol, benzyl benzoate, chlorobutanol, etc.), solubilizing agent, surface active agent, etc. The concentration of the compound (I) in oil injections is about 1 to about 50 mg./ml. Other administration forms are buccal tablets, ointments, suppositories, etc.

An effective dose of the compounds (I) when administered intramuscularly or subcutaneously is usually about 8 to 25 mg. for two weeks for an adult weighing 50 kg.

It is to be understood that the following examples are solely for the purpose of illustration and are not intended to be construed as limitations of this invention, and that many variations may be resorted to without departing from the spirit and scope of this invention. In this specification, "kg.," "g.," "ml.," and "mg." are "kilogram," "gram," "milliliter," and "milligram," respectively. Temperatures are all uncorrected, and percentages are all on the weight basis.

EXAMPLE 1

To a solution of 0.2 g. of (+)17β-hydroxyestr-4-en-3-one in 3 ml. of pyridine, there is added 0.15 ml. of phenoxyacetyl chloride, and the mixture is left standing overnight. Water is added to the reaction solution, and the product is extracted with ether. The ether layer is washed with dilute sulfuric acid, an aqueous sodium hydrogencarbonate solution and water in this order, and then dried. The ether is distilled off to leave a residue, which is recrystallized from a mixture of ether and hexane (1:1) to give 0.15 g. of crystals of (+)17β-phenoxyacetyloxyestr-4-en-3-one melting at 135° C.

$[\alpha]_D^{22} = 45°$ (CHCl$_3$, c.=1.0)

Elementary analysis:
Calculated for $C_{26}H_{32}O_3$ (percent): C, 76.44; H, 7.90.
Found (percent): C, 76.01; H, 7.90.

The pharmacological test on 17β-phenoxyacetyloxyestr-4-en-3-one demonstrates that it is characterized by a strong and prolonged anabolic effect together with a favorable therapeutic index and minimal ill effects.

(1) MYOTROPHIC AND ANDROGENIC ACTIVITIES (10 DAYS ASSAY)

(1) Method

These activities were assayed by the modified Hershberger's Method (Hershberber, L.G., et al.: Proc. Soc. Exp. Biol. Med. vol. 83, p. 175; 1953) and Dorfman's Method (Dorfman, R.I.: Method in Hormone Research, vol. II (Academic Press), pp. 275–313, 1965). Young male rats weighing 40 to 55 g. (21 days old) were castrated. The castrated rats were injected subcutaneously with the test solution of 19-NTPA [1] or 19-NTPP [2] (control) in sesame oil. The day after the last administration the rats were measured as to their body weight (B.W.) and then were sacrificed for the observations.

[1] 19-NTPA = 19-nor-testosterone phenoxyacetate(17β-phenoxyacetyloxyestr-4-en-3-one).
[2] 19-NTPP = 19-nor-testosterone phenylpropionate(17β-phenylpropionyloxyestr-4-en-3-one).

(2) Results (1) *Body weight and organ weight.*—Remarks: Sem. V.= Seminal vesicles; V. pros.=Ventral prostate; L. ani.=Levator ani muscle.

TABLE 1

| Compound | Total dose (mg.) | Number of rats | Increased B.W. (g) | Sem. V. | V. pros. | L. ani. |
|---|---|---|---|---|---|---|
| Control [1] | | 14 | 67.1 | 7.2 | 7.9 | 25.5 |
| 19-NTPA | 0.075 | 7 | 73.9 | 8.5 | 8.7 | 35.5 |
| | 0.15 | 8 | 74.6 | 10.5 | 9.6 | 53.2 |
| | 0.3 | 8 | 81.8 | 17.5 | 15.2 | 74.2 |
| | 0.6 | 8 | 83.1 | 28.0 | 20.9 | 79.0 |
| | 1.2 | 8 | 86.1 | 65.5 | 42.9 | 89.3 |
| | 2.4 | 4 | 81.6 | 164.4 | 71.6 | 89.3 |
| | 4.8 | 8 | 84.9 | 277.7 | 106.3 | 99.7 |
| | 9.6 | 4 | 80.5 | 336.4 | 125.3 | 91.2 |
| | 19.2 | 4 | 79.4 | 432.1 | 132.0 | 101.9 |
| 19-NTPP | 0.075 | 7 | 68.5 | 8.3 | 8.4 | 32.7 |
| | 0.15 | 8 | 73.2 | 8.5 | 8.1 | 40.0 |
| | 0.3 | 10 | 72.9 | 10.7 | 9.6 | 52.2 |
| | 1.2 | 9 | 79.2 | 27.4 | 18.1 | 82.7 |
| | 2.4 | 10 | 79.4 | 67.8 | 43.0 | 92.5 |
| | 4.8 | 10 | 85.0 | 143.4 | 66.8 | 103.6 |
| | 9.6 | 10 | 80.4 | 277.6 | 105.3 | 95.6 |
| | 19.2 | 4 | 79.1 | 366.3 | 115.2 | 109.9 |

[1] Sesame oil only.

The linear regression equations according to the results shown in Table 1 are shown in Table 2.

TABLE 2

| Index | Compound | Dose of linear part (mg.) | Linear regression equation |
|---|---|---|---|
| L. ani | 19-NTPA | 0.075–1.2 | $y = 44.12 \log x + 89.1$ |
| | 19-NTPP | 0.15–2.4 | $y = 44.67 \log x + 76.9$ |
| V. pros | 19-NTPA | 0.6–9.6 | $y = 92.20 \log x + 38.3$ |
| | 19-NTPP | 1.2–9.6 | $y = 95.37 \log x + 2.0$ |
| Sem. V | 19-NTPA | 1.2–19.2 | $y = 306.76 \log x + 27.8$ |
| | 19-NTPP | 2.4–19.2 | $y = 345.27 \log x - 89.3$ |

(3) Concluding remarks

The relative anabolic and androgenic effects of 19-NTPA are about twice of those of 19-NTPP respectively, and the anabolic/androgenic ratio of 19-NTPA is equal to that of 19-NTPP.

(II) 2 WEEKS INTERVAL ADMINISTRATION

(1) Method

Young male rats of 21 days old were castrated and then subcutaneously injected with 19-NTPA or 19-NTPP dissolved in sesame oil 5 times every 2 weeks. After 10 weeks, they were sacrified and submitted to anatomical dissection to measure the organ weights.

(2) Results

The results are summarized in Table 3.

TABLE 3

| Compound | Dose (mg./kg.) | Number of rats | Sem.V. | V.Pros. | L.ani. |
|---|---|---|---|---|---|
| Control [1] | | 7 | 8.7 | 6.4 | 99.3 |
| 19-NTPA | 0.3125 | 7 | 12.5 | 8.5 | 246.5 |
| | 1.25 | 7 | 69.1 | 20.6 | 356.0 |
| | 5 | 7 | 227.0 | 40.9 | 447.1 |
| | 20 | 7 | 1,065.5 | 320.0 | 436.9 |
| | 80 | 7 | 1,885.9 | 592.0 | 410.6 |
| 19-NTPP | 0.3125 | 7 | 11.5 | 9.0 | 200.7 |
| | 1.25 | 7 | 70.1 | 20.3 | 316.5 |
| | 5 | 7 | 170.1 | 27.5 | 423.0 |
| | 20 | 7 | 1,180.0 | 340.5 | 413.0 |
| | 80 | 7 | 1,985.0 | 620.0 | 380.8 |

[1] Sesame oil only.

(1) *Anabolic effects.*—Regarding levator ani muscle weight, its linear regression equation was obtained from the data collected at the dose points of 0.3125, 1.25 and 5 mg./kg. as the following equations:

19-NTPA—$y = 166.07 \log x + 333.89$

19-NTPP—$y = 180.19 \log x + 297.52$ (2) *Androgenic effects.*—In regard to seminal vesicles and ventral prostate weight, the linear regression equations were obtained respectively from the data collected at the dose points of 5, 20 and 80 mg./kg. dose as following equations:

Sem. V. $\begin{cases} 19\text{-NTPA}—y=1378.62 \log x-740.58 \\ 19\text{-NTPP}—y=1511.50 \log x-859.46 \end{cases}$ V. pros. $\begin{cases} 19\text{-NTPA}—y=456.77 \log x-277.26 \\ 19\text{-NTPP}—y=484.18 \log x-305.92 \end{cases}$ (3) Concluding remarks The anabolic effect of 19–NTPA is stronger (1.5 to 2 times) than that of 19–NTPP in 2 weeks-interval administration, while the androgenic effect of the former is substantially the same as that of the latter. Therefore, administration of 19–NTPA every 2 weeks over a long period results in that the anabolic effect of 19–NTPA is stronger than that of 19–NTPP and that the anabolic/androgenic ratio of the former is higher than that of the latter.

(III) CHRONIC TOXICITY (1) Method 48 normal male S.P.F. (specific pathogene free) rats (SD-JCL strain), which were 26 days old at the beginning of the tests were used. They were kept in an air-conditioned room under the S.P.F. environment and allowed to feed on free access sterilized chow and water. These animals were divided into 3 groups, each consisting of 16 rats. Each group was injected subcutaneously with 19–NPTA or 19–NTPP dissolved in sesame oil in a dose of 20 mg. of 19–NTPA or 19–NTPP per kg. of body weight twice a week for 12 weeks, and then the animals were submitted to various tests.

(2) Results (1) *Mortality.*—The administration did not cause any change in mortality.

(2) *Blood test.*—The following tests were carried out.

(1) Red blood cell counts (R.B.C.)  ⎫ with Sanborn-
(2) White blood cell counts           ⎬ Frommer
   (W.B.C.                              ⎭ Cell-Counter
(3) Hemoglobin (by the method of Sahli)
(4) Hematocrit (by the method of Wintrobe)
(5) Total cholesterol
(6) Nonprotein nitrogen (N.P.N.)     ⎫ (with Auto-
(7) Alkaline phosphatase (Alk. phosph.) ⎬ Analyzer)
(8) Blood glucose
(9) Total protein (T. Prot.) (with a hand portion refractometer)
(10) Glutamic-oxaloacetic transaminase ⎫ Reitman-
    (G.O.T.)                            ⎬ Frankel's
(11) Glutamic-pyruvic transaminase (G.P.T.) ⎭ method
(12) Bromosulfophthalin (B.S.P.) Test These test results showed no significant differences between 19–NTPA group and 19–NTPP group.

(3) *Urine test.*—Test animals' urine was tested with Combistix test reagent paper strips for urinary protein, glucose and pH, but no significant differences between control group and test group were observed.

(4) *Histological test.*—There are not observed anything unusual in heart, lung, liver, kidney, pancreas, stomach, intestine, bone, marrow, Peyer's patch, thyroid, and testis, while slight hypotrophy are observed in thymus, lymph node, spleen, pituitary and adrenal. However, there was nothing of significance between these 19–NTPA and 19–NTPP groups in these slight usual symptoms.

(5) *Concluding remarks.*—From these results, it is clear that there are no observable differences between 19–NTPA and 19–NTPP in chronic toxicity, when they are administered in the same dose. However, as the myotrophic effect of 19–NTPA is twice of that of 19–NTPP, it is concluded that 19–NTPA has less chronic toxicity than 19–NTPP.

EXAMPLE 2

To a solution of (±)17β-hydroxy-6,6-dimethylestr-4-en-3-one in 3 ml. of pyridine, there is added 0.15 ml. of phenoxyacetyl chloride, and the mixture is left standing overnight. Water is added to the reaction solution, and the product is extracted with ether. The ether layer is washed with dilute sulfuric acid, an aqueous sodium hydrogencarbonate solution and water in this order, and then dried. The ether is distilled off to leave 0.18 g. of oils of (±)17β - phenoxyacetyloxy - 6,6 - dimethylestr-4-en-3-one.

Infrared absorption $\nu_{max.}^{film}$ (cm.$^{-1}$): 1735 (ester),
1670 (α,β-unsaturated ketone at 3 position)
1600, 1495 (aromatic ring)

Nuclear magnetic resonance (60 megacycle; CDCl$_3$)

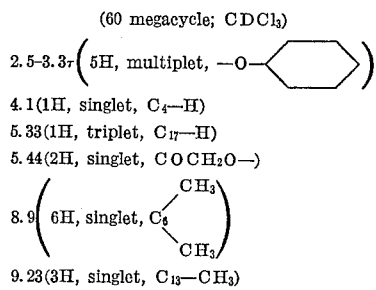

4.1(1H, singlet, C$_4$—H)
5.33(1H, triplet, C$_{17}$—H)
5.44(2H, singlet, COCH$_2$O—)

8.9 $\left(6H, \text{singlet}, C_6\begin{matrix}CH_3 \\ CH_3\end{matrix}\right)$ 9.23(3H, singlet, C$_{13}$—CH$_3$)

The pharmaceutical test on (±)17β-phenoxyacetyloxy-6,6-dimethylestr-4-en-3-one is carried out by the same method as (I) (1) of Example 1. The body weight and organ weight results are shown in Table 4.

TABLE 4

| Compound | Dose | Number of rats | Organ weight (mg.) | | |
|---|---|---|---|---|---|
| | | | Sem. V. | V. Pros. | L. ani. |
| Control [1] | | 14 | 7.2 | 7.9 | 25.5 |
| 19-NTPP | 0.3 | 10 | 10.7 | 9.6 | 52.2 |
| | 1.2 | 9 | 27.4 | 18.1 | 82.7 |
| | 4.8 | 10 | 143.4 | 66.8 | 103.6 |
| 6-DMPA [2] | 0.3 | 7 | 10.5 | 11.5 | 80.0 |
| | 1.2 | 7 | 52.0 | 61.0 | 109.0 |
| | 4.8 | 7 | 216.0 | 125.0 | 133.6 |

[1] Sesame oil only.
[2] 6–DMPA—6,6-dimethyl-19-nor-testosterone phenoxy - acetate (17β-phenoxyacetyloxy-6,6-dimethylestra-4-en-3-one).

EXAMPLE 3

(+) or (−) 6,6-dimethyl-19-nor-testosterone 17-phenoxyacetate 0.15 g. of (−)6,6 - dimethyl - 19 - nor-testosterone is treated in the same manner as described in Example 2 to give 0.15 g. of (+)6,6-dimethyl - 19 - nor-testosterone 17-phenoxyacetate.

$[\alpha]_D^{23} = -0.2°$ (CHCl$_3$, c.=1.0)

In the same manner as above, (−)6,6-dimethyl-19-nor-testosterone 17-phenoxyacetate is obtained from (+)6,6-dimethyl-19-nor-testosterone.

$[\alpha]_D^{23} = +0.2°$ (CHCl$_3$, c.=1.0)

The starting material (+) or (−)6,6-dimethyl-19-nor-testerone, is prepared, for example, as follows:

(1) Optical resolution of (±)3-methoxy-6,6-dimethyl-estra-1,3,5(10),8-tetraen-17β-ol To a solution of 1 g. of (±)3-methoxy-6,6-dimethylestra-1,3,5(10),8-tetraen-17β-ol 17-hydrogensuccinate in a mixture of 3 ml. of methanol and 10 ml. of acetone, there is added 0.9 g. of quinine dissolved in a mixture solvent of 2 ml. of methanol and 5 ml. of acetone. The whole mixture is shaken well, and is left standing to precipitate crystals. The crystals are collected by filtration and then recrystallized from a mixture of methanol and acetone to give 0.5 g. of crystals melting at 110° to 115° C.

$$[\alpha]_D^{26} = 49.6° \ (CHCl_3, c.=1)$$

The mother liquor is concentrated and the rsidue is recrystalilzed from acetone to give 0.9 g. of crystals melting at 180° to 183° C.

$$[\alpha]_D^{26} = 87.0° \ (CHCl_3, c.=1)$$

(2) (+) or (−)3-methoxy-6,6-dimethylestra-1,3,5(10),8-tetraen-17β-ol 17-hydrogensuccinate Thus-obtained crystals melting at 110 to 115° C. are dissolved in 30 ml. of chloroform. To the solution is added 30 ml. of a 10% aqueous solution of sulfuric acid and the mixture is shaken, followed by the separation of the chloroform layer. The chloroform layer is shaken with 30 ml. of a 10% sulfuric acid solution twice further. Thus-obtained chloroform layer is washed with water, dried, and subjected to evaporation to remove chloroform to give 0.25 g. of residue, which is recrystallized from an aqueous solution of methanol to give 0.2 g. of crystals of (+)3-methoxy-6,6-dimethylestra-1,3,5(10),8-tetraen-17β-ol 17-hydrogensuccinate melting at 79 to 83° C.

$$[\alpha]_D^{26} = +42.5° \ (CHCl_3, c.=0.5)$$

The crystals melting at 180° to 183° C. are treated in the same manner as mentioned above to obtain 0.2 g. of crystals of (−)3-methoxy-6,6-dimethylestra-1,3,5(10),8-tetraen-17β-ol 17-hydrogensuccinate melting at 79° to 83° C.

$$[\alpha]_D^{26} = 48.5° \ (CHCl_3, c.=1.0)$$

(3) (+) or (−)3-methoxy-6,6-dimethylestra-1,3,5(10),8-tetraen-17β-ol

To a solution of 1.5 g. of (+)3-methoxy-6,6-dimethyl-estra-1,3,5(10),8-tetraen-17β-ol 17-hydrogensuccinate in 80 ml. of methanol is added 5 ml. of 10% aqueous solution of sodium hydroxide with stirring under ice-cooling, and the mixture is left standing overnight. The reaction solution is extracted with ether and the ether layer is washed with water, dried, and subjected to evaporation to remove ether to give 0.7 g. of residue, which is recrystallized from an aqueous solution of methanol to give 1 g. of crystals of (+)3-methoxy-6,6-dimethylestra-1,3,5(10),8-tetraen-17β-ol melting at 118° to 120° C.

$$[\alpha]_D^{24} = 11° \ (CHCl_3, c.=1.0)$$

(−)3-methoxy-6,6-dimethylestra-1,3,5(10),8-tetraen-17β-ol 17-hydrogensuccinate is treated in the same manner as mentioned above to give crystals of (−)3-methoxy-6,6-dimethylestra-1,3,5(10),8-tetraen-17β-ol melting at 118° to 120° C.

$$[\alpha]_D^{24} = -14.0° \ (CHCl_3, c.=1.0)$$

(4) (+) or (−)6,6-dimethyl-19-nor-testosterone

A mixture of 0.5 g. of (+)3-methoxy-6,6-dimethyl-estra-1,3,5(10),8-tetraen-17β-ol, 20 ml. of dioxane, 30 ml. of ether and 80 ml. of liquid ammonia is cooled at −50° C., and 0.8 g. of lithium is added to the solution, followed by agitation of the mixture for 2 hours. 30 ml. of ethanol is added dropwise to the reaction solution, and the resultant solution is left standing at room temperature to remove ammonia. Water is added to the residue and the mixture is extracted with ether. The ether layer is washed with water, dried, and subjected to evaporation to remove the solvent, to give 0.3 g. of crystals.

Thus-obtained crystals are dissolved in 15 ml. of tetrahydrofuran, and 2 ml. of 6-normal hydrochloric acid is added to the solution, followed by agitation of the mixture for 40 minutes at room temperature. The reaction solution is further stirred for 5 minutes at 60° C. Water is added to the resultant solution and the mixture is extracted with ether. The ether layer is washed with water, dried, and subjected to evaporation to remove ether. The residue is chromatographed on a column packed with silica-gel and eluted with a mixture of benzene and ether. From the eluate is obtained 0.15 g. of (+)6,6-dimethyl-19-nor-testosterone, which is recrystallized from a mixture of acetone and hexane to give a crystals melting at 125° C.

$$[\alpha]_D^{23} = +10.6° \ (CHCl_3, c.=1.0)$$

(−)3 - methoxy - 6,6-dimethylestra-1,3,5(10),8-teraen-17β-ol is treated in the same manner as mentioned above to give 0.15 g. of (−)6,6-dimethyl-19-nor-testosterone melting at 125° C.

$$[\alpha]_D^{23} = -11.0° \ (CHCl_3, c.=1.0)$$

Some examples of pharmaceutical compositions containing the compounds (I) are shown as follows:

Composition 1

|  | G. |
|---|---|
| 17β-phenoxyacetyloxyestra-4-en-3-one | 10 |
| Purified sesame oil—add to make 1000 ml. | |

Composition 2

|  | G. |
|---|---|
| 17β-phenoxyacetyloxyestr-4-en-3-one | 2 |
| Purified sesame oil—add to make 1000 ml. | |

Composition 3

|  | G. |
|---|---|
| 17β-phenoxyacetyloxyestr-4-en-3-one | 15 |
| Anhydrous chlorobutanol | 20 |
| Purified sesame oil—add to make 1000 ml. | |

Composition 4

|  | G. |
|---|---|
| 17β-phenoxyacetyloxyestr-4-en-3-one | 25 |
| Benzyl benzoate | 150 |
| Anhydrous chlorobutanol | 20 |
| Purified sesame oil—add to make 1000 ml. | |

Composition 5

|  | G. |
|---|---|
| 17β-phenoxyacetyloxy-6,6-dimethylestr-4-ene-3-one | 10 |
| Anhydrous chlorobutanol | 20 |
| Purified sesame oil—add to make 1000 ml. | |

Having thus disclosed the invention, what is claimed is:
1. A compound of the formula:

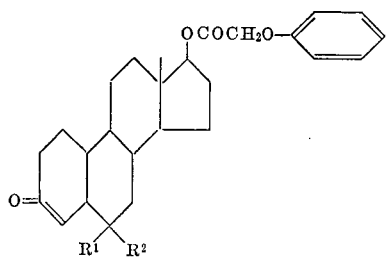

wherein each of $R^1$ and $R^2$ is H or methyl.

2. A compound according to claim 1, namely, 17β-phenoxyacetyloxy-6,6-dimethylestr-4-en-3-one.

3. A compound according to claim 1, namely, 17β-phenoxyacetyloxy-6-methylestr-4-en-3-one.

4. A compound according to claim 1, namely, 17β-phenoxyacetyloxyestr-4-en-3-one.

5. A pharmaceutical composition which comprises a minor but therapeutically effective amount of a compound according to claim 1 together with pharmaceutically acceptable carrier, said composition being administrable in unit dosage form.

References Cited

UNITED STATES PATENTS

| | | | |
|---|---|---|---|
| 2,891,078 | 6/1959 | Colton et al. | 260—397.4 |
| 3,338,925 | 8/1967 | Fried | 260—397.4 |

OTHER REFERENCES

Gould et al.: Chemistry and Industry, October 1955, pp. 1424–5.

Gould et al.: Jour. Amer. Chem. Soc., August 1957, pp. 4472–5.

D'Silva et al.: Tetrahedron Letters—No. 50, 1965, pp. 4487–4493.

LEWIS GOTTS, Primary Examiner

E. G. LOVE, Assistant Examiner

U.S. Cl. X.R.

260—239.55, 397.4, 397.5